(12) United States Patent
Simonneaux

(10) Patent No.: US 8,955,798 B2
(45) Date of Patent: Feb. 17, 2015

(54) AIRCRAFT LANDING GEAR

(75) Inventor: Yann Simonneaux, Cheltenham (GB)

(73) Assignee: Messier-Dowty Limited, Gloucester (GB)

( * ) Notice: Subject to any disclaimer, the term of this patent is extended or adjusted under 35 U.S.C. 154(b) by 84 days.

(21) Appl. No.: 13/502,822

(22) PCT Filed: Apr. 30, 2010

(86) PCT No.: PCT/GB2010/050715
§ 371 (c)(1),
(2), (4) Date: Jun. 8, 2012

(87) PCT Pub. No.: WO2011/048393
PCT Pub. Date: Apr. 28, 2011

(65) Prior Publication Data
US 2012/0241558 A1    Sep. 27, 2012

(30) Foreign Application Priority Data

Oct. 20, 2009 (GB) .................................. 0918337.7

(51) Int. Cl.
*B64C 25/02* (2006.01)
(52) U.S. Cl.
CPC ........................................ *B64C 25/02* (2013.01)
USPC ................................. 244/100 R; 244/102 SS
(58) Field of Classification Search
USPC ......................................... 244/100 R, 102 SS
See application file for complete search history.

(56) References Cited

U.S. PATENT DOCUMENTS

| | | | | | |
|---|---|---|---|---|---|
| 1,819,414 | A | * | 8/1931 | Gruss | 267/64.15 |
| 1,955,142 | A | * | 4/1934 | Minshall et al. | 244/104 R |
| 2,326,210 | A | * | 8/1943 | Falk et al. | 244/104 R |
| 2,692,739 | A | * | 10/1954 | Martin et al. | 244/102 SL |
| 2,866,633 | A | * | 12/1958 | Schnitzer | 267/64.15 |
| 3,473,369 | A | * | 10/1969 | Garrison | 73/65.06 |
| 3,822,048 | A | * | 7/1974 | Hartel | 244/104 R |
| 3,826,450 | A | * | 7/1974 | Currey et al. | 244/103 R |
| 4,405,119 | A | * | 9/1983 | Masclet et al. | 267/64.22 |
| 2007/0108344 | A1 | * | 5/2007 | Wood | 244/102 R |
| 2009/0176078 | A1 | * | 7/2009 | Seror et al. | 428/218 |
| 2010/0017052 | A1 | * | 1/2010 | Luce | 701/16 |

FOREIGN PATENT DOCUMENTS

| | | |
|---|---|---|
| CN | 101279645 A | 10/2008 |
| RU | 2085445 C1 | 7/1997 |
| WO | WO-2004/089742 | 10/2004 |

OTHER PUBLICATIONS

International Search Report in PCT/GB2010/050715 mailed Dec. 1, 2010.
Written Opinion in International Application No. PCT/GB2010/050715 mailed Dec. 1, 2010.
First Office Action in Russian Application No. 2012120293/11(030542) dated Mar. 18, 2014.
First Office Action in Chinese Application No. 201080047976.4 dated Jan. 28, 2014.

* cited by examiner

*Primary Examiner* — Justin Benedik
(74) *Attorney, Agent, or Firm* — Marshall, Gerstein & Borun LLP

(57) ABSTRACT

An aircraft landing gear includes at least one load bearing longitudinal structural element. The longitudinal structural element is hollow and is arranged to have a non-structural element located inside.

12 Claims, 4 Drawing Sheets

AIRCRAFT LANDING GEAR

BACKGROUND

Environmental concerns and noise certification regulations have driven the significant reduction in jet engine noise in airplanes. As result, airframe noise has emerged has a leading component of aircraft noise during the final approach phase of a landing. One of the main contributors to this airframe noise in a landing configuration is the landing gear. In particular, on larger airplanes the landing gear is becoming the dominant source of noise. Landing gear systems have complex, non-streamlined geometries and generate highly turbulent wakes. Vortices shed from one component of the landing gear tend to impinge on other elements, thus generating noise. Furthermore, it is common practice to mount non-load bearing (non-structural) elements of the landing gear, such as hydraulic pipes, electric cables and locking springs, on the external surface of the load bearing structural elements, such as the telescopic struts and side stays. As a consequence the airflow over the landing gear is further disrupted. This is also exacerbated by the non-streamlined cross-section of some of the load bearing elements of the landing gear, such as the side-stays.

Initial efforts to reduce the noise generated by the landing gear when deployed have been focused on encompassing the existing landing gear structures in various streamlined fairings. Examples of this approach are disclosed in United States Patent Application US2009/0176078 and International Patent Application WO2004/089742. However, this approach adds weight and complexity, and hence cost, because the aerodynamic fairings are merely introduced in addition to the existing landing gear structures.

SUMMARY

According to a first aspect of the present invention there is provided an aircraft landing gear including at least one load bearing longitudinal structural element wherein said longitudinal element is hollow and is arranged to have at least one non-structural element located inside.

The longitudinal structural element preferably has an external surface arranged to streamline the airflow around it when in use. The external cross-section, and hence the overall shape, of the longitudinal element may vary along its length.

The longitudinal structural element may include at least one area of local reinforcement. This may comprise an area of increased wall thickness of the hollow longitudinal element.

In at least one embodiment of the present invention the longitudinal structural element comprises a side stay, whilst the non-structural element may, either in addition or in other embodiments, comprise one or more springs.

BRIEF DESCRIPTION OF THE DRAWINGS

Some embodiments of the present invention are described below, by way of non-limiting illustrative examples only, with reference to the accompanying figures, of which.

DETAILED DESCRIPTION

Figure 1:
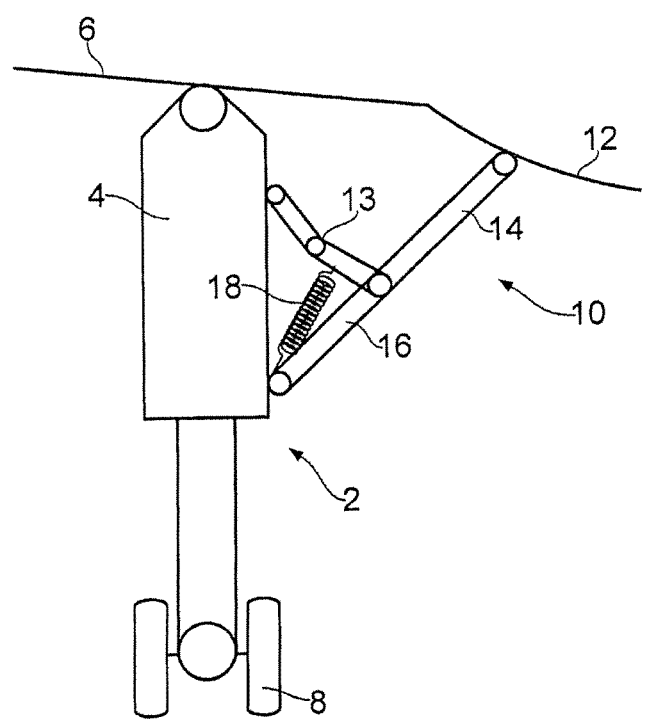
FIG. 1 schematically illustrates the main landing gear of an aircraft according to the prior art.

Referring to FIG. 1, the main landing gear for a large aircraft, such as a commercial airliner, is schematically illustrated. The main landing gear 2 includes a telescopic shock strut 4 pivotally connected at its upper end to the underside of the aircraft wing 6, with one or more sets of undercarriage wheels 8 attached at its opposite end. A side stay 10 is pivotally connected between the shock strut 4 and main body of the aircraft 12, with a lock stay 13 pivotally connected between the shock strut and side stay to lock the side stay in position when the landing gear is deployed. The side stay 10 comprises an upper stay 14 pivotally connected to a lower stay 16 and typically functions to maintains the shock strut in the desired deployed position and to react any loadings applied to the shock strut during landing or take off of the aircraft. One or more springs 18 are connected between the lower stay 16 and the lock stay 13 to bias the lock stay into its locked position and hence lock the landing gear in its deployed (extended) position.

Figure 2:
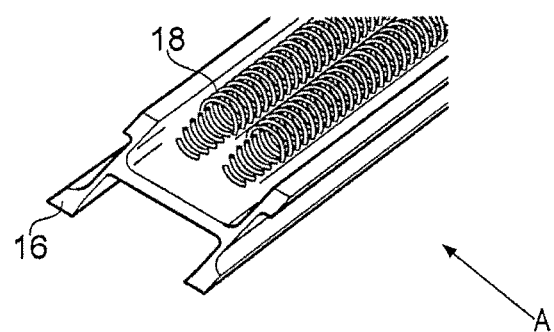
FIG. 2 schematically illustrates a detail of the prior art landing gear shown in FIG. 1.

A cross-section through the lower stay 16 and pair of springs 18 is shown in FIG. 2. In a typical prior art arrangement the lower stay 16 closely approximates to a H-beam with the springs 18 located between the two side walls. The direction of airflow is given by the arrow A. The non-aerodynamic profile of the combination of stay 16 and springs 18 generates drag and results in a turbulent slip stream, therefore generating significant noise.

Figure 3:
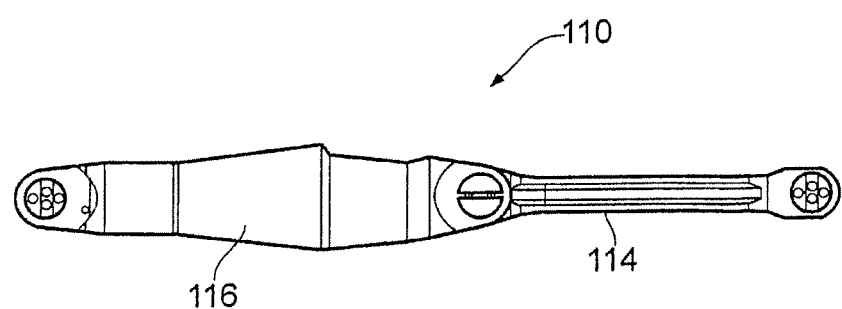
FIG. 3 schematically illustrates a part of an aircraft landing gear according to an embodiment of the present invention.
Figure 4:
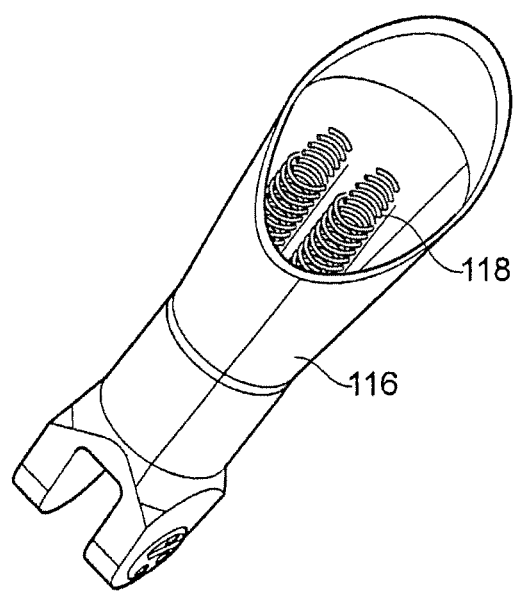
FIG. 4 schematically illustrates in detail a section of the landing gear element shown in FIG. 3.

FIG. 3 schematically illustrates a side stay 110 constructed in accordance with an embodiment of the present invention. The stay 110 includes a lower stay 116 that has a streamlined external surface, in this particular example a rounded external surface, as can be more clearly seen from FIG. 4. FIG. 4 illustrates the lower stay 116 in partial cross-section from which it can be seen that the lower stay 116 has a generally circular cross-section and is hollow. The actual cross-section of the stay will be determined by the desired extent of aerodynamic streamlining to be achieved or other desired aerodynamic properties. For example, the stay may have an oval or an asymmetric cross-section. Additionally, the cross-section of the stay may vary either in shape or dimension, or both, along its length. In the particular example illustrated in FIG. 3, the stay has a greater cross-sectional diameter at a midsection of the lower stay 116 in comparison with the diameter of the end sections.

As illustrated in FIG. 4, the hollow space within the load bearing structural longitudinal element of landing gear, i.e. the stay, is used to house the lock springs 118. It will of course be appreciated that the lock springs 118 are only one example of non-structural elements of the landing gear, with other examples including hydraulic piping and electronic cabling.

An advantage of locating the non-structural elements of the landing gear within the hollow load bearing element is that the non-structural elements are removed from the air stream and therefore do not contribute to the turbulence and noise generated by the landing gear as a whole. In addition, by streamlining the external surface of the load bearing structural element a further reduction in turbulence and noise generated by the load bearing element itself is achieved. As illustrated in FIG. 3, a mixture of streamlined load bearing elements according to embodiments of the present invention, such as the lower stay 116, can be used in combination with a conventional non-streamlined load bearing elements, such as the upper stay 114. For example, in certain landing gear configurations and arrangements certain load bearing elements, such as the upper stay 114, may not significantly contribute to the turbulence and airframe noise generated by the landing gear such that the use of streamlined load bearing elements according to embodiments of the present invention do not produce any significant reduction in the overall airframe noise. A further advantage associated with locating the non-structural elements inside the hollow load bearing elements of embodiments of the present invention is that the non-structural elements, such as the stay springs, are no longer subject to the risk of impact damage during takeoff and landing operations.

Figure 5:
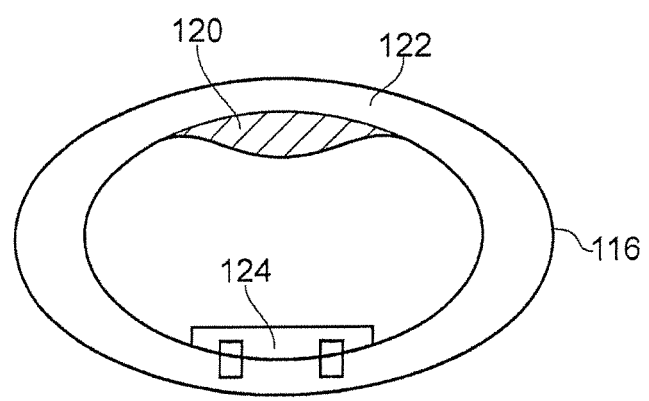
FIG. 5 schematically illustrates a cross-section of the landing gear element illustrated in FIGS. 3 and 4.

Conventional materials, such as metal alloys or fibre reinforced plastic composites, may be used for the manufacture of the landing gear elements according to embodiments of the present invention. The internal and external geometry of the load bearing element can be varied to provide the desired strength and weight characteristics of the load bearing element. For example, a local reinforcement in particular areas may be provided, as illustrated in FIG. 5, by either providing an area of increased wall thickness 120 formed integrally with the side wall 122 of the stay 116 or by securing by an appropriate reinforcing element 124 to the load bearing element.

The invention claimed is:

1. Aircraft landing gear comprising at least one load bearing longitudinal structural element including a first portion and a second portion, the first portion being movably coupled with respect to the second portion such that the longitudinal structural element can be folded and unfolded, wherein said longitudinal structural element is hollow and has at least one non-load bearing, non-structural element located inside, with a first portion of the non-load bearing, non-structural element being disposed inside the first portion of the longitudinal structural element and a second portion of the non-load bearing, non-structural element being disposed inside the second portion of the longitudinal structural element.

2. Aircraft landing gear according to claim 1, wherein the longitudinal structural element has an external surface arranged to streamline airflow around it when in use.

3. Aircraft landing gear according to claim 2, wherein the external cross-section of the longitudinal structural element varies along its length.

4. Aircraft landing gear according to claim 1, wherein the longitudinal structural element includes at least one area of local reinforcement.

5. Aircraft landing gear according to claim 4, wherein the area of local reinforcement comprises an area of increased wall thickness of the longitudinal structural element.

6. Aircraft landing gear according to claim 1, wherein the longitudinal structural element comprises a side stay.

7. Aircraft landing gear according to claim 1, wherein the non-structural element comprises a spring.

8. Aircraft landing gear according to claim 1, wherein the first portion of the load bearing longitudinal structural element is pivotally coupled to the second portion of the load bearing longitudinal structural element.

9. Aircraft landing gear according to claim 1, wherein the load bearing longitudinal structural element is not a shock absorber.

10. Aircraft landing gear according to claim 1, wherein the coupling between the first and second portions of the load bearing longitudinal structural element is configured to cause the first portion to move relative to the second portion in a non-axial manner.

11. Aircraft landing gear according to claim 1, wherein the non-structural element is entirely contained within the load bearing longitudinal structural element.

12. Aircraft landing gear according to claim 1, wherein the non-structural element is arranged to bias the load bearing longitudinal structural element to assume an unfolded configuration.

* * * * *